2,927,075
WASTE WATER TREATMENT

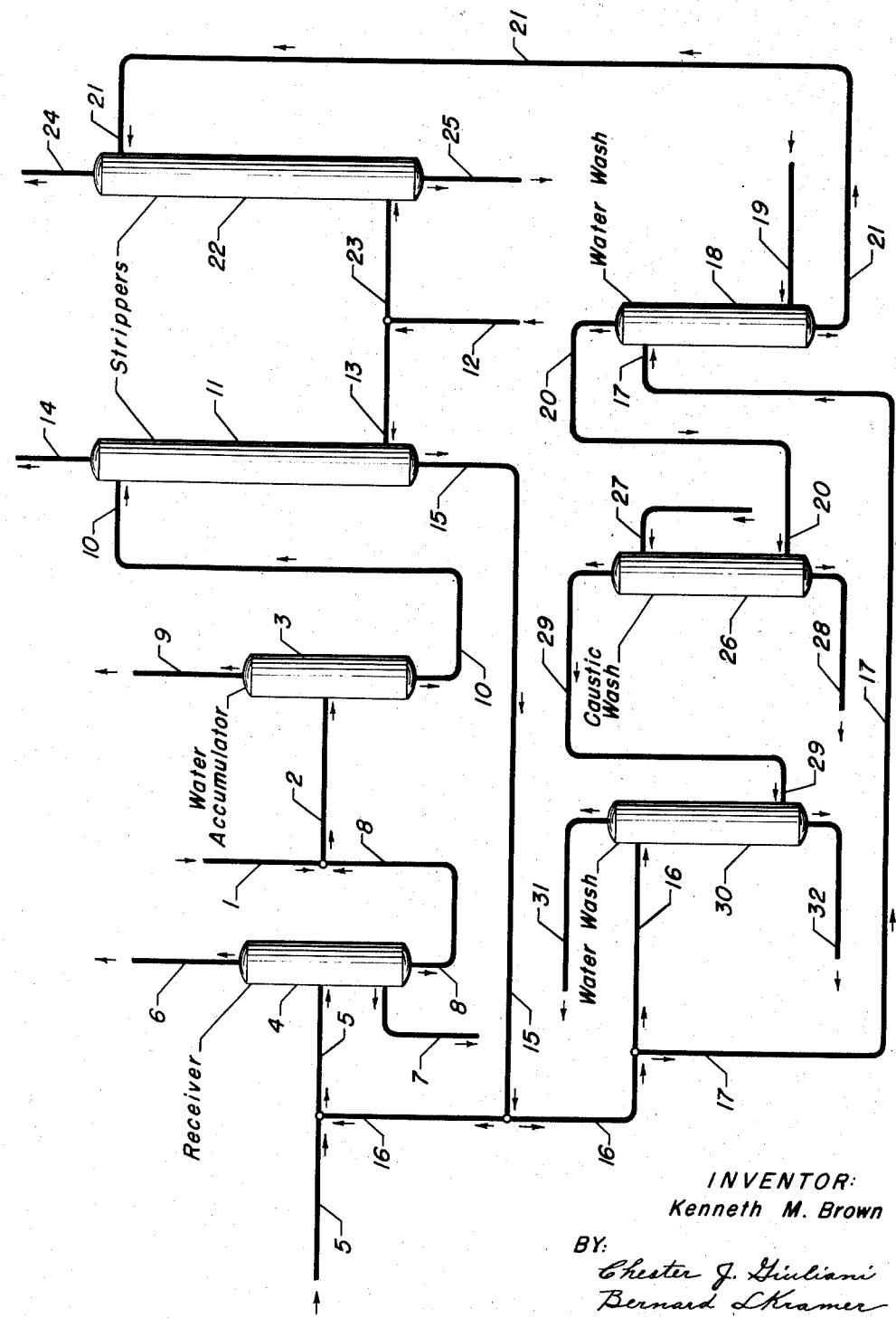

Kenneth M. Brown, Hinsdale, Ill., assignor, by mesne assignments, to Universal Oil Products Company, Des Plaines, Ill., a corporation of Delaware Application May 18, 1956, Serial No. 585,814

4 Claims. (Cl. 208—208)

This invention relates to a method of treating refinery waste water and in particular to a process for treating refinery waste water so that it may be disposed of, or preferably, reused in the processing of petroleum. In the operation of a refinery, a petroleum crude oil is processed to form many products. In the course of such operations, to prepare these fractions for their intended use, many impurities that are naturally present in the crude are encountered. The more abundant of these impurities are hydrogen sulfide and ammonia, although many others are prominent such as, for example, mercaptans, cyanides, phenols, etc. Large quantities of water are used in refining petroleum for many uses, such as purifying fractions, steam distillations, dilution, heat transfer, diluting corrosive materials, etc. When used as a purifying medium the water becomes contaminated with the contaminants removed from the petroleum. When otherwise used in contact with petroleum, the water will contain at least an equilibrium distribution of the contaminants contained in the petroleum. Formerly water used in processing for either purification or processing purposes, when contaminated, was disposed of by discharging the water into a stream or some other available body of water. With the increase in the size of refineries and the number of processing steps in a refining operation, the amount of contaminants reached such proportions as to pollute streams or lakes to such an extent that the fish, marine life and animals in the vicinity suffered. The matter of disposing of refinery waste water is a major refining problem.

In many areas processing water is not available in sufficient quantity so that it may be used and discarded. It is therefore advantageous and in some cases essential to reuse water rather than to continuously use fresh water. In some refining processes it is necessary to treat and purify water taken from a natural source prior to use in order to remove minerals therefrom, and in these processes it is especially desirable to reuse the water and thereby reduce the amount of treating necessary.

In accordance with the present invention, contaminated water from various refinery sources is accumulated and reduced to substantially atmospheric pressure, after which the contaminated water is passed into a zone wherein it is countercurrently contacted with a stripping gas which removes the volatile contaminants from the water and thereby produces a contaminant-containing gas stream and a substantially volatile contaminant-free water stream. It is contemplated that the stripping gas stream will comprise sweet fuel gas, sweet natural gas, flue gas, etc., or any combinations thereof. It is particularly desirable that these gases are used since they are all available at a refinery at sufficient pressure to be used in an atmospheric stripping operation. It is particularly desirable to use sweet natural gas or sweet fuel gas for stripping since the subsequent burning of these gases oxidizes the more noxious contaminants, such as hydrogen sulfide and mercaptans, to less objectionable forms which may be vented to the atmosphere. Flue gas may also be passed through a combustion zone to effect the oxidation of the noxious contaminants. The water purified in the process may be disposed of by discharging it into a body of water or, in a preferred embodiment, it may be reused in the refinery since it is substantially free of corrosive contaminants.

Water from many refinery sources may be purified by the process of the present invention. Water used in purifying a polymerization unit feed stock and water used in the process of catalytic cracking are especially susceptible to purification by this invention. A polymerization unit feed stock must be substantially free of ammonia to prevent the poisoning of the polymerization catalyst. Scrubbing a polymerization feed stock with water transfers ammonia, hydrogen sulfide and other contaminants into the water phase and thereby produces a polymerization unit feed stock reduced in these contaminants. In a catalytic cracking process water in the form of steam may be used to increase the velocity of the flow in the riser of the catalytic cracking unit or to strip the catalyst of objectionable material as, for example, stripping the catalyst passing from the reaction zone to the regeneration zone of entrained oil, which stripping generally is accomplished with steam. Another use of water in a catalytic cracking process is as a diluent for the aqueous phase in the overhead receiver of the primary fractionator. The water used in this manner is important in that it reduces the concentration of corrosive impurities in the water phase and thereby substantially reduces corrosion of equipment.

Generally, water from the above enumerated uses, as well as from other refinery uses, contains volatile sulfur and nitrogen-containing compounds, as well as a small percentage of non-volatile compounds, mostly phenols. An extremely small quantity of inorganic compounds also may be contained in the water, mostly iron compounds that result from corrosion of the equipment. In order to prevent a build up of non-volatile impurities it is contemplated that a small portion of the circulating water stream is discarded and fresh water is added continuously to keep the non-volatile impurities at a tolerable level. In many cases the water normally used in processing will be sufficient fresh water. The build up of non-volatile oil soluble impurities may be eliminated in another manner which is presented here as a special embodiment of this invention.

In one embodiment of the present invention, water from various refinery sources contaminated with volatile and non-volatile contaminants is passed into countercurrent contact with a stream of stripping gas which results in the removal of the volatile contaminants from the water. The treated water stream then is passed into countercurrent contact with a polymerization unit feed stock which results in the removal of oil soluble contaminants, such as phenols, from the water and transfer thereof into the polymerization unit feed stock. The introduction of phenols, the most abundant oil-soluble contaminant, into a polymerization unit feed stock is not harmful to the polymerization catalyst and, in fact, the phenols and reaction products are desirable constituents of the polymerization unit products in that they are mild oxidation inhibitors. The water passing from contact with the polymerization unit feed stock contains hydrogen sulfide, mercaptans if present, etc., and ammonia but is reduced in phenol content. This water stream is then passed into countercurrent contact with a stream of stripping gas in a separate stripping zone to remove the volatile contaminants, thus leaving a water stream substantially free from contaminants. This water stream is sufficiently pure that it may be disposed of by discharging into surface waters or otherwise. However, in many cases, particularly where a shortage of water exists, this stream of water is supplied to the refinery processing system for reuse therein.

The polymerization unit feed, after water washing, will be reduced in acidic contaminants and ammonia. However, in many cases, water washing is not sufficient to reduce all of these contaminants to a satisfactory degree and, in such cases, it is necessary to treat the polymerization unit feed with an alkaline treating reagent and particularly sodium hydroxide (caustic), potassium hydroxide, or other alkaline treating reagent. In accordance with the present invention, the water washed polymerization unit feed is treated with the alkaline reagent in a separate treating zone. After the alkaline treating, the polymerization unit feed preferably is subjected to another water washing treatment to remove entrained alkaline treating reagent. In accordance with the present invention, the final water washing of the treated polymerization unit feed is effected by passing the polymerization unit feed in countercurrent contact with another portion of the treated water stream from the first mentioned stripper. The water stream from the final washing treatment will contain a small concentration of ammonia and phenols but also may contain entrained hydrocarbons. This water stream advantageously is supplied to the refinery processing system to recover the hydrocarbons and to reuse the water.

Preferably a portion of the treated water from the first stripping zone is returned to the refinery process for use therein. A portion of this treated water stream may be passed to a steam generator where it is converted to steam for use in the refinery process. It is contemplated that this steam, after use and condensation, will be returned to the stripper for purification. The net result of passing a small stream of treated water through a steam generator is to continuously remove inorganic, non-volatile compounds from the water stream by depositing them in the steam generator to be disposed of with the blow down water of the steam generator. This is not harmful to the steam generator since the water does not contain corrosive contaminants, which previously were stripped out, but just a small amount of corrosion products. Another portion of the treated water stream may be supplied to different points in the refinery process scheme where the presence of water is required or desirable.

An advantage of the process of the present invention is that the only cost involved to incorporate the present process into an existing refinery flow is the cost of the equipment. Stripping gas is already available in a refinery at sufficient pressure for the operation of the present process and it may be directed through the stripper prior to passing to its ultimate destination. When a catalytic cracking unit is used in the refinery, there is an abundance of regenerator flue gas at a pressure in excess of 10 p.s.i. When fuel gas or natural gas is used as a fuel, the gas must be supplied to the burners at sufficient pressure, and for a very small additional expense these gases may be passed through the stripping column prior to passing them into a burner. Inasmuch as the stripping column may be operated at atmospheric pressure, no elaborate pumping equipment to charge contaminated water thereto will be necessary. A second commercial advantage is that extremely large volumes of stripping gas are available for the amount of water to be purified. When regenerator flue gas is to be used as the stripping gas, it is also an advantage that large volumes of high temperature gases are available, to add heat to the process. When regenerator flue gas is used as the stripping gas, the process in effect will consist of venting the regenerator flue gases to the atmosphere through a stripping column and a subsequent combustion zone.

From the description set forth above, it will be noted that the present invention offers a novel method of treating and utilizing waste water from refinery processes.

The novel process provides a treated water which may be disposed of without harmful effects to the neighborhood streams. As mentioned earlier, it will be necessary to discharge at least a small portion of water, either continuously or intermittently, in order to make room for fresh water introduced into the process. However, in accordance with the present invention, the amount of fresh water required is reduced considerably and the only water actually discarded is the small amount to prevent build up of inorganic contaminants in the water streams.

The invention will be explained with reference to the accompanying flow diagrammatic drawing which illustrates a preferred embodiment of the invention. In the interest of simplicity, valves, pumps, heaters and similar appurtenances have been omitted from the drawing but will be provided as required. Furthermore, in the interest of simplicity, the drawing illustrates the treating unit in combination with an overhead receiver from a refinery process. However, it is understood that the water coming to and going from the treating unit also may come from and go to other portions of the refinery process including, for example, the reactor of a catalytic cracking process, generally after steam generation, to be used as a stripping medium in the cracking reactor, to a gas concentration ssytem and particularly before heat exchangers, coolers, and/or receivers in order to dissolve ammonium salts and prevent plugging of the coolers and exchangers.

Referring to the drawing, contaminated water from the refinery process passes through lines 1 and 2 into accumulator 3. As mentioned earlier, the drawing illustrates an overhead receiver 4, into which fractionator overhead of a catalytic cracker is directed through line 5. The fractionator overhead contains gasoline, water, impurities and normally gaseous hydrocarbons, generally all material boiling below about 430° F. In many operations, receiver 4 is a high pressure receiver, in which case normally gaseous hydrocarbons and gasoline are withdrawn from the upper portion through line 6 and passed through a cooler into a low pressure receiver. In other cases, receiver 4 may serve to separate gaseous hydrocarbons from liquid hydrocarbons, in which case the gases are withdrawn through line 6 and the liquid hydrocarbons are withdrawn through line 7.

Regardless of the operation of receiver 4, water therefrom is withdrawn through line 8 and is directed through line 2 into accumulator 3. Accumulator 3 is provided with vent line 9 in the upper portion thereof and line 10 in the lower portion thereof. Contaminated water accumulated in zone 3 is passed through line 10 into the upper portion of stripper 11. In stripper 11 the contaminated water descends and is countercurrently contacted with a stream of stripping gas entering the lower portion of stripper 11 through lines 12 and 13. Stripping gas, along with volatile contaminants contained in the water, discharges from the upper portion of stripper 11 through line 14. The gas in line 14 may pass to a burner or may be vented to the atmosphere or used in any other desired manner as, for example, an odorant for natural gas. Stripped water substantially free of volatile contaminants passes from the lower portion of stripper 11 through line 15 and, in the particular embodiment illustrated in the drawing, splits into three streams. One of these streams passes through line 16 into line 5, wherein the stream is commingled with the net fractionator overhead from the primary fractionator of a catalytic cracking unit. The water in line 5 commingles with the fractionator overhead and passes into receiver 4 wherein, as hereinbefore set forth, the stream splits into a hydrocarbon phase and a water phase. The water phase dissolves equilibrium proportions to all water-soluble material in the gasoline fraction. Many highly water-soluble impurities in the gasoline fraction are extremely corrosive and, in order to avoid concentrated corrosive solutions, it is necessary to dilute the water phase by adding water thereto. It is understood that the water may be introduced ahead of a cooler, not illustrated, inserted between the fractionator and the receiver. The water phase in receiver 4 passes through lines 8 and 2 to accumulator 3 as hereinbefore described.

Another stream of the stripped water in line 15 is passed through lines 16 and 17 into the upper portion of water wash zone 18. In zone 18 stripped water from zone 11 countercurrently contacts a polymerization unit feed introduced into the lower portion of column 18 through line 19. Polymerization feed is contaminated with ammonia, which is a poison for polymerization catalysts, and with hydrogen sulfide and, in some cases, mercaptans. The countercurrent contact in zone 18 of water and polymerization feed produces a polymerization feed reduced in ammonia, hydrogen sulfide and mercaptans, if present, and a water stream contaminated with ammonia, hydrogen sulfide and, if present, mercaptans. The water introduced through line 17 contains phenols and, in zone 18, transfers at least a portion of the phenols from the water phase to the polymerization feed. The partly purified polymerization feed passes from the upper portion of column 18 through line 20 for further treatment in the manner to be hereinafter described.

The contaminated water from zone 18 is withdrawn therefrom through line 21 and passes into the upper portion of stripper 22. As hereinbefore set forth, this water stream contains ammonia, hydrogen sulfide, mercaptans, if present, and is reduced in phenol concentration. In zone 22, the water is passed countercurrently to a rising stream of stripping gas introduced through lines 12 and 23 and this serves to strip the water free of ammonia, hydrogen sulfide and mercaptans, if present, and to leave a treated water substantially free of contaminants. The stripped gas and volatile contaminants are withdrawn from the upper portion of zone 22 through line 24 and may be disposed of in a manner similar to that described in connection with stripped gas being withdrawn through line 14 from stripper 11. The treated water is withdrawn from the lower portion of zone 22 through line 25 and, as hereinbefore set forth, is of sufficient purity that it may be discharged into surface waters or disposed of otherwise without harmful effects.

As hereinbefore set forth, the partly treated polymerization feed is withdrawn from zone 18 through line 20. In many cases the polymerization feed originally contained relatively large concentrations of acidic impurities, as well as ammonia, and water washing is not a sufficient treatment to reduce the acidic impurities to a satisfactory extent. In accordance with the present invention, the partly reated polymerizaion feed is passed through line 20 into caustic wash zone 26, wherein it is treated either continuously or batch-wise with a suitable alkaline treating reagent introduced through line 27 into zone 26. This treatment is well-known in the art and preferably comprises an aqueous caustic (sodium hydroxide) solution. In place of sodium hydroxide, potassium hydroxide or other alkaline treating reagents may be employed, and the treating agent also may contain solubilizers, solutizers, etc., which generally will comprise alcohols and particularly methanol and ethanol, phenols, cresols, xylenols, etc. It is understood that any suitable alkaline treating reangent may be employed.

Generally the caustic employed will contain phenols. Contacting the polymerization unit feed with the caustic will transfer a substantial amount of the phenols from the caustic to the polymerization feed. This alleviates another disposal problem in that the used caustic withdrawn from zone 26 through line 28 will comprise principally sodium sulfide and will contain only a trace of phenols.

The treated polymerization unit feed is withdrawn from zone 26 through line 29. This fraction will be free of hydrogen sulfide but may contain entrained alkaline treating reagent, as well as phenols. As mentioned earlier, the phenols are desirable in the polymerization feed but the alkaline treating reagent should be removed. In order to remove entrained alkaline reagent, the caustic treated polymerization unit feed is passed into water wash zone 30. Conveniently, the polymerization unit feed is contacted with another stream of the stripped water from line 15, which is directed through line 16 into the upper portion of zone 30. As hereinbefore described, this water is free of volatile contaminants but contains phenols, and treatment in zone 30 serves to transfer phenols from the water to the polymerization unit feed and to remove alkaline treating reagent from the polymerization unit feed. The treated polymerization unit feed is withdrawn from the upper portion of zone 30 through line 31 and is passed to the polymerization unit. In a preferred method, the treated water withdrawn from zone 30 is passed through line 32 into the gas concentration system of the refinery or to the catalytic cracking unit, wherein the water serves to pick up additional contaminants and is ultimately returned by way of lines 1 and 2 into water accumulator 3 and is treated in the manner hereinbefore described.

It is understood that the various stripping and contacting towers will contain suitable means for effecting intimate contact of the streams introduced thereto. Zones 18, 26 and 30 generally will contain contacting means such as sieve decks, bubble caps, etc., and/or suitable packing material such as Berl saddles, Raschig rings, or the like. Strippers 11 and 22 also will contain suitable contacting means including, for example, bubble caps, trays, sieve decks, packing, or the like.

Generally the water being passed into stripper 11 will be at an elevated temperature, usually between about 150° and 212° F., and at atmospheric pressure, higher temperature being used with superatmospheric pressure, in order that any ammonium salts formed at lower temperature and contained in the water are decomposed to ammonia, hydrogen sulfide, etc. The heating of the water may be effected in any suitable manner and generally will be accomplished by passing the water in indirect heat exchange with a suitable hot refinery stream. If such a stream is not available, a small heater may be provided for this purpose.

The polymerization unit feed generally will be available at an elevated pressure, and zones 18, 26 and 30 preferably are operated at an elevated pressure, usually between 100 to 200 pounds per square inch, or more, in order to maintain the polymerization unit feed substantially in liquid phase. In this manner, phenols in the water are readily transferred to and dissolved in the liquefied polymerization unit feed. As hereinbefore set forth, suitable pumps will be provided in order to pump the water to the desired pressure for use in zones 18 and 30. The treated water being withdrawn through line 32 from zone 30 may contain hydrocarbons dissolved therein and, as hereinbefore set forth, preferably is directed to the gas concentration unit of the refinery system in order to recover whatever hydrocarbons are dissolved in the water.

I claim as my invention:

1. A method of treating waste water from petroleum refining processes to remove hydrogen sulfide, ammonia and phenols therefrom, which comprises stripping hydrogen sulfide and ammonia from said waste water, contacting a portion of the thus treated water-containing phenols with a hydrocarbon polymerization unit feed stock containing hydrogen sulfide and ammonia to remove a portion of the hydrogen sulfide and ammonia from said feed stock and to transfer phenols from said treated water to the hydrocarbon feed stock, contacting the resultant phenol-containing feed stock with caustic solution of a concentration which will remove additional hydrogen sulfide therefrom, and thereafter contacting said feed stock with another portion of said treated water containing phenols to remove entrained caustic solution from and to introduce additional phenols to the feed stock.

2. A method of treating waste water from petroleum refinery processes to remove volatile contaminants and phenols therefrom, which comprises passing said waste water into countercurrent contact with a stream of stripping gas in a first stripping zone, withdrawing therefrom stripping gas containing volatile contaminants and separately withdrawing a treated water stream containing phenols, passing a portion of said treated water stream into countercurrent contact in a first wash zone with a hydrocarbon polymerization unit feed containing volatile contaminants to remove a portion of the volatile contaminants and to transfer phenols from the water stream to said polymerization unit feed, withdrawing a water stream containing volatile contaminants and separately withdrawing a polymerization unit feed reduced in volatile contaminants but containing phenols, separately passing the last mentioned water stream into countercurrent contact with a stripping gas in a second stripping zone, withdrawing therefrom stripping gas containing volatile contaminants and separately withdrawing a treated water stream considerably reduced in volatile contaminants and phenols, passing said partly treated polymerization unit feed from said wash zone into countercurrent contact in a second wash zone with an alkaline treating reagent of a concentration which will remove a substantial portion of the remaining volatile acidic contaminants from said polymerization unit feed, withdrawing treated polymerization unit feed from the second wash zone and passing it into countercurrent contact in a third wash zone with another portion of the first mentioned treated water stream from said first stripping zone to thereby remove basic volatile contaminants from said polymerization unit feed, and separately withdrawing from the third wash zone a polymerization unit feed reduced in volatile contaminants but containing phenols.

3. A method of treating waste water from petroleum refining processes to remove hydrogen sulfide, ammonia and phenols therefrom, which comprises passing said waste water into countercurrent contact with a stream of stripping gas in a first stripping zone, withdrawing therefrom a stripped gas containing hydrogen sulfide and ammonia and separately withdrawing a treated water stream containing phenols, passing a portion of said treated water stream into countercurrent contact in a first wash zone with a hydrocarbon polymerization unit feed containing hydrogen sulfide and ammonia to remove a portion of the hydrogen sulfide and ammonia therefrom and to transfer phenols from the water stream to said polymerization unit feed, withdrawing therefrom a water stream containing hydrogen sulfide and ammonia, and separately withdrawing a polymerization unit feed reduced in hydrogen sulfide and ammonia but containing phenols, separately passing the last mentioned water stream into countercurrent contact with a stream of stripping gas in a second stripping zone, withdrawing stripped gas containing hydrogen sulfide and ammonia and separately withdrawing a treated water stream considerably reduced in hydrogen sulfide, ammonia and phenols, passing said partly treated polymerization unit feed from said first wash zone into countercurrent contact in a second wash zone with caustic solution of a concentration which will remove a substantial portion of the remaining hydrogen sulfide from said polymerization unit feed, withdrawing the treated polymerization unit feed from the second wash zone and passing it into countercurrent contact in a third wash zone with another portion of the first mentioned treated water stream from said first stripping zone to remove ammonia from said polymerization unit feed, and separately withdrawing from the third wash zone a polymerization unit feed reduced in hydrogen sulfide and ammonia but containing phenols.

4. The method of treating water separated from the effluent products of a catalytic cracking unit, said water containing volatile contaminants and phenols, which comprises passing said water into countercurrent contact with a stream of stripping gas in a first stripping zone, recovering from said stripping zone a water stream substantially reduced in volatile contaminants but containing phenols, passing a portion of said treated water to the catalytic cracking unit, countercurrently contacting in a first wash zone a hydrocarbon polymerization unit feed with another portion of said treated water to remove volatile contaminants from said polymerization unit feed and to transfer phenols from the water to the polymerization unit feed, withdrawing a water stream containing volatile contaminants and separately withdrawing a polymerization feed reduced in volatile contaminants but containing phenols, passing said water stream into countercurrent contact with a stream of stripping gas in a second stripping zone, recovering therefrom a water stream substantially reduced in volatile contaminants and phenols, disposing of at least a portion of said last mentioned water stream, subjecting the partly treated polymerization unit feed to contact in a second wash zone with caustic solution of a concentration which will remove a substantial portion of the remaining volatile acidic contaminants from said polymerization unit feed, and washing the caustic washed polymerization unit feed with another portion of the first mentioned treated water from said first stripping zone.

References Cited in the file of this patent

UNITED STATES PATENTS

| 1,847,221 | Morgen | Mar. 1, 1932 |
| 2,773,003 | Brown | Dec. 4, 1956 |

FOREIGN PATENTS

| 514,263 | France | Oct. 15, 1952 |

OTHER REFERENCES

"Industrial Wastes: Their Disposal and Treatment," by W. Rudolfs, 1st ed., published by Reinhold Pub. Corp., N.Y., 1953, pages 438, 440.